2. Sheets. Sheet. 1.
P. J. Clever,
Sewing Machine.
No. 3776. Reissued Dec. 28. 1869.
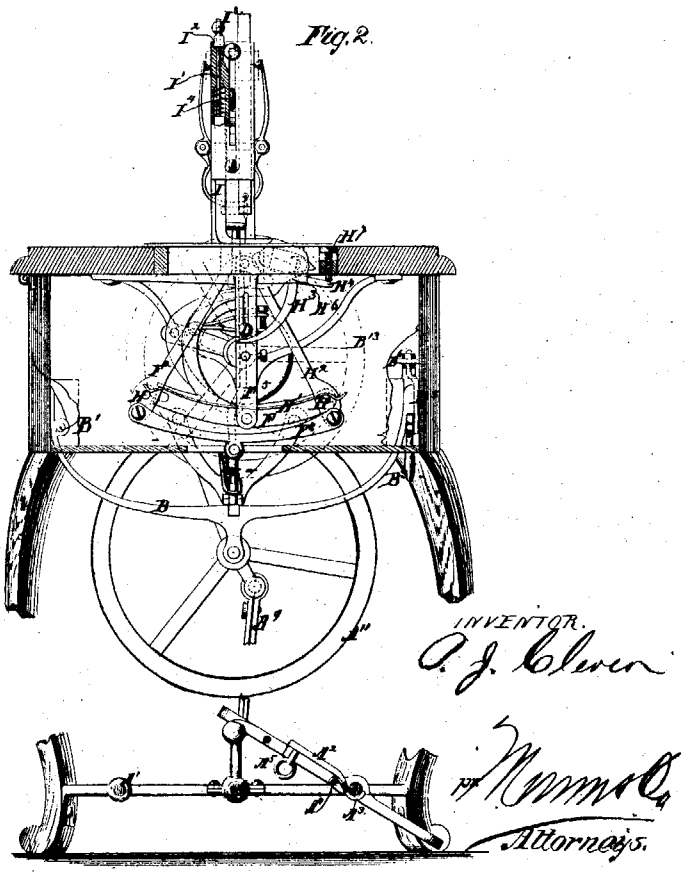
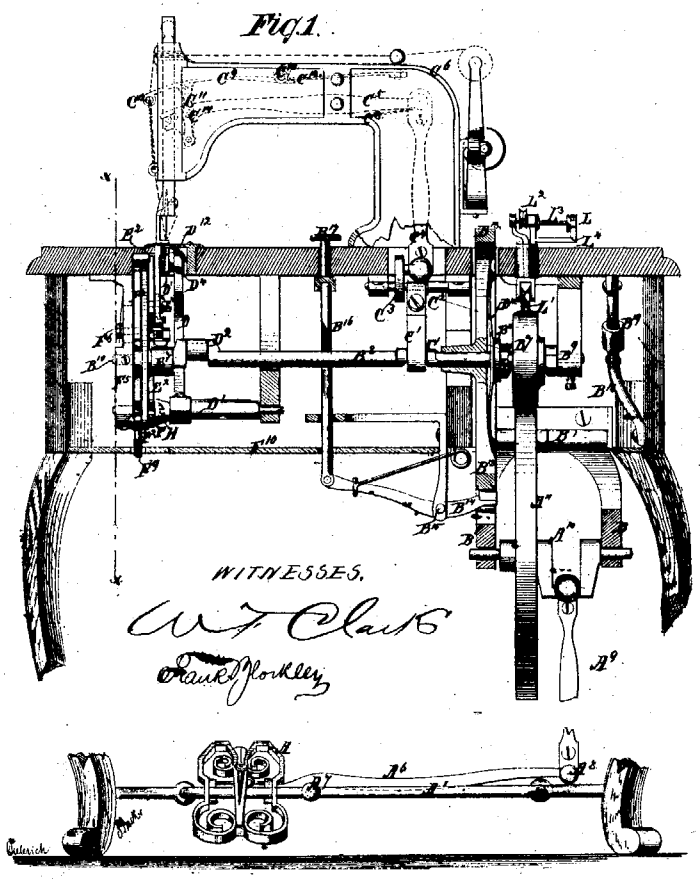
N. PETERS, PHOTO-LITHOGRAPHER, WASHINGTON, D. C.

F. J. Clever,
2. Sheets. Sheet. 2.
Sewing Machine.
No. 3,776. Reissued Dec. 28. 1869.
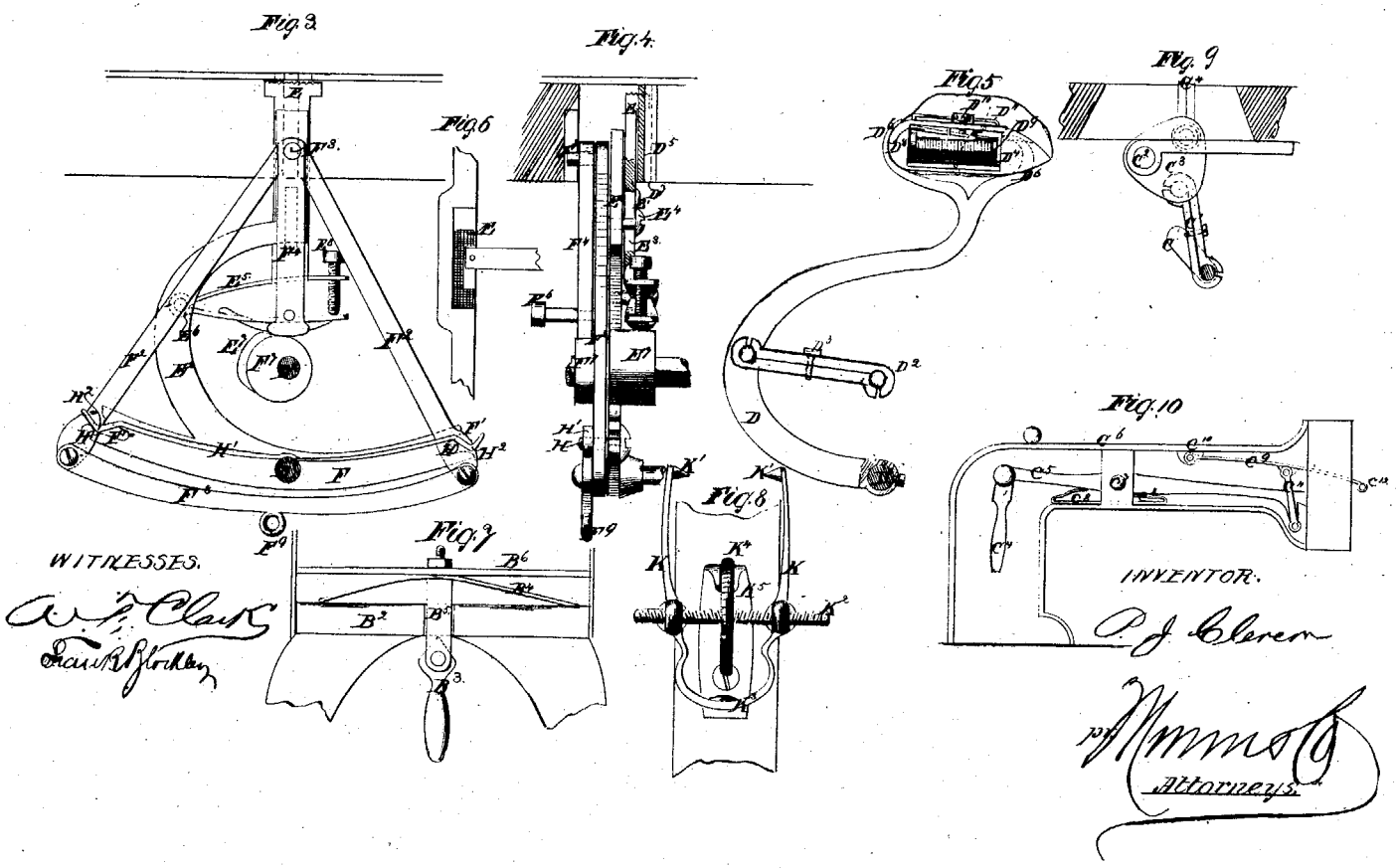
N. PETERS, PHOTO-LITHOGRAPHER, WASHINGTON, D. C.

UNITED STATES PATENT OFFICE.

P. J. CLEVER, OF GOLIAD, TEXAS.

IMPROVEMENT IN SEWING-MACHINES.

Specification forming part of Letters Patent No. 96,886, dated November 16, 1869; Reissue No. 3,776, dated December 28, 1869.

*To all whom it may concern:*

Be it known that I, P. J. CLEVER, of Goliad, in the county of Goliad and State of Texas, have invented a new Improved Sewing-Machine; and I do hereby declare that the following is a full, clear, and exact description thereof, which will enable others skilled in the art to make and use the same, reference being had to the accompanying drawings, forming part of this specification.

This invention relates to improvements in sewing-machines, and has for its object to provide more useful and efficient machines than those now in use.

The invention consists in the combination and arrangement of the operating devices, as hereinafter described.

Figure 1 represents a longitudinal sectional elevation of my improved machine. Fig. 2 represents a transverse sectional elevation taken on lines *x x* of Fig. 1. Fig. 3 is a detail showing a side elevation of the devices for operating the feed device and arranged to feed in either of two directions. Fig. 4 is an elevation of the same at right angles to the elevation of Fig. 3 and partly sectioned. Fig. 5 is a detail showing the shuttle and shuttle-carrying arm and the connecting-rod for operating it. Fig. 6 is a plan view of the feed-shoe. Fig. 7 is a detail showing the arrangement for throwing the friction driving-wheel into or out of gear with the friction-wheel on the crank-shaft. Fig. 8 is a front elevation of the tension device. Fig. 9 is a detail showing the arrangement of devices introduced between the crank-shaft and the needle-arm for working the latter; and Fig. 10 is a sectional elevation of the needle-arm and cloth-presser support, showing the arrangement of the needle-arm and tension-spring.

Similar letters of reference indicate corresponding parts.

The treadle A has semicircular recesses to fit the rods of frame A′, and it is held in position to be operated by a lever, $A^2$, having a curved recess at one end, $A^3$, that fits the rod of said frame under the recesses of the treadle, and at the other end the lever is provided with a turn-button, which, after passing through a slot in the treadle, is turned transversely thereof to lock the clamping-lever.

The treadle is connected to a lever-arm, $A^6$, by a connecting-rod, which rod is wrist-jointed to both said treadle and lever-arm, as plainly shown in Figs. 1, 2. This arm is fixed to a shaft, $A^7$, rocking on points screwed in frame A′. The other end of said arm is at $A^8$ wrist-jointed to a connecting-rod, $A^9$, and this rod is also wrist-jointed to a crank of crank-shaft $A^{10}$. All this construction and arrangement has for its purpose that the treadle may be unlocked by the turn-button and loosened by the clamp, so that it may be raised at the rear from its frame and turned on a wrist-joint to either side or one end, to be fastened and locked again on said frame, so that the machine may be worked at either side or end of the table.

The connecting-rod $A^9$ is slotted at its ends, forming open spring-like ends, which fit and are closed by screws on the ball-shaped end of the lever-arm $A^6$ and the crank of crank-shaft $A^{10}$, and, owing to this construction, the joints may be adjusted to compensate for wear.

The crank-shaft $A^{10}$, on which is mounted a friction driving-wheel, $A^{11}$, turns on adjustable bearings or points held by set-screws in frame B, hinged at one end, B′, within the table-frame, and at the opposite side said frame is capable of rising and falling, and has a fixed bar, $B^2$, resting on an eccentric plate, $B^3$, pivoted to a hanger, $B^5$, secured to a bar, $B^6$, fixed within the table-frame and provided at its upper end with a screw and nut for adjusting the height of the hanger.

The plate $B^3$ is provided with a cam and a handle for turning it, and so that a movement in one direction will raise and the other lower the frame B, so that the driving-wheel and friction-wheel $B^7$ are thrown in or out of contact. When the frame is down the driving-wheel may be revolved without giving motion to the other parts.

Under the bar $B^6$ is a spring, $B^4$, bearing on bar $B^2$, fixed to frame B, to give a downward pressure to the frame.

The friction-wheel $B^7$ is constructed of a metallic box, fitting loosely on crank-shaft $B^8$. This box has one fixed round metallic plate at one end and near the other end a similar plate fitting loosely on it, and at the end it is provided with a screw-thread and nut. One or more india-rubber round plates of larger diameter than the metallic plate may be arranged with their centers on said box between the metallic plates and permanently secured by the screwed nut.

The friction-wheel $B^7$ clutches with a ratchet-clutch, $B^{11}$, connected to the crank-shaft $B^8$, so as to impart rotary motion to it, but capable of sliding on it to and from the wheel, and provided with a spring, $B^{12}$, to keep it up against the clutch on the wheel. This arrangement is provided, so that if the driving-wheel is turned the wrong way the clutches will slip and will not turn the crank-shaft.

$B^{13}$ is a balance-wheel on crank-shaft $B^8$, and $B^{14}$ a friction brake-lever, pivoted at $B^{15}$, and provided with a rod, $B^{16}$, rising up to the under side of the table-plate, through which a finger-stud, $B^{17}$, with a socket in the bottom for the reception of the upper end of the rod $B^{16}$, works, so that the operator may bring the brake into contact with the wheel by pressing down thereon.

The finger-stud $B^{17}$ rests on but is not connected positively with the rod $B^{16}$, in order that the table-plate, which is hinged on one side, may be raised when required.

The brace $B^{18}$ and sleeve $B^{19}$ are provided for holding the table-plate when raised. The brace is pivoted at the upper end to the under side of the table and at the lower to one side within the table-frame and jointed in the middle. The lower part of the brace has a slight curve, to allow the two parts to lie together when the table is down, and the upper part of the lower brace, above the pivoted point of connection with the upper brace, is beveled, so that as the table is raised and the brace straightened the curved part will raise the sleeve, to afterward drop down and hold the braces together when in line.

The crank-shaft $B^8$ is movable on adjustable points in the ends held by set-screws in the brackets $B^9$ and $F^5$, and has two inside cranks, C and $D^2$, which are connected to the other parts by two connecting-rods, C′ and $D^3$. Each rod is composed of two pieces, constructed as shown in Figs. 5 and 9, held together by one screw and adjustable so as to compensate for wear.

The crank C is connected by the rod C′ with a pin or an oscillating plate, $C^3$, fixed to a shaft, $C^2$, and oscillating on pointed adjustable bearings held by set-screws in a support screwed to the under side of the table. Said plate has also a globular headed wrist-pin, to connect with a connecting-rod, $C^4$, on one side, to prevent twists on the bearings, and thereby reduce friction.

The connecting-rod $C^4$ is formed, like the rod $A^9$, to fit the ball-shaped parts of the oscillating plate $C^3$ and needle-arm $C^5$. This arm has a fixed axis, resting on points in the plates at each side of the needle-arm support.

In Fig. 10 are shown double springs, below $C^7$, under the needle-arm, by which said arm is arrested at the ends of each movement.

$C^9$ represents the vibrating thread-tension spring, pivoted to the needle-arm support at $C^{10}$, and connected to the needle-arm by a link.

The springs $C^8$ and $C^{13}$ in Fig. 1 has the same effect as the double springs $C^8$ have in Fig. 10; but by the former the link $C^{11}$ must have a joint, which in the latter case is unnecessary.

The shuttle-carrier D has at its lower end a journal, D′, which rests and oscillates on adjustable bearing-points held by set-screws in brackets. The shuttle is carried between the forked springs $D^6$, at the upper end of the arm D, and the arm is curved so that it may be arranged in a perpendicular direction to the crank-shaft $B^8$ and the needle-arm support to provide room for the feeding mechanism.

$D^4$ is the shuttle in its spring-forks $D^6$ of the curved arm D.

The face of the plate $D^5$ is provided with a vertical groove for the needle, so that the loops from the needle project out of the said recess beyond the point of the shuttle.

The tension device for the shuttle-thread is a spring, $D^8$, bearing on one end, $D^9$, of the bobbin, and is adjusted by a set-screw, $D^{10}$, passing through the upper side of the shuttle, and guarded, so as not to catch the thread, by curved wire guard $D^{11}$. This screw may be reached for adjusting it, by a screw-driver, through a slot of the table covered by a slide, $D^{12}$.

E is a feed-shoe, the upper face of which is plainly seen in Fig. 6. It is the upper end of a vertical bar, E′, supported on its carrier $E^2$, so as to slide up or down thereon. It is slotted at $E^3$, and slides on a pin, $E^4$, of the carrier $E^2$, and has a pin near its lower end and that rests in an eye on the upper leaf of a double spring, $E^5$, pivoted at $E^6$ to the carrier $E^2$, and arranged so that it bears the lower leaf on cam $E^7$ on crank-shaft $B^8$. In the end of the upper leaf of said spring $E^5$ is an adjusting-screw, $E^8$, with its lower end bearing on the end of the lower leaf, for raising the upper with the vertical bar E′ on it more or less to adjust the height of the feed-shoe, and the lower leaf is provided with two holes, in which a leather strip is arranged, so as to bear on cam $E^7$, and so that it may easily be renewed.

The carrier $E^8$ is particularly curved, that it may be out of reach of cam $E^7$ or crank-shaft $B^8$, and also be used as a support for the pivot $E^6$ of spring $E^5$, and is joined at the lower end with a curved arm, F, pivoted on shaft D′, projecting at equal distances from said shaft, and provided with notches in the ends. In front of this carrier is an inverted-V-shaped frame, $F^2$, pivoted at $F^3$ to a vertically-sliding bar, $F^4$, working up and down on the bracket $F^5$. The pivot-pin, at $F^3$, is fixed in bar $F^4$, and projecting from the front side of the bar near its bottom, and working in and through a slot in the bracket is a pin, $F^6$.

The bar $F^4$ is provided with a piece of leather to bear on cam $F^7$, also on shaft $B^8$, which throws simultaneously with the cam $E^7$. The lower ends of the arms $F^2$ are connected by a curved bar, $F^8$, provided with a stud, $F^9$, projecting through the bottom $F^{10}$ of the case. The arms $F^2$ are provided, a short distance above the bar $F^8$, with stud-pins H, permanently attached and projecting from each side. On the rear side these pins have heads standing about the distance of the thickness of the arm F from the arms $F^2$. On the front side of these arms is a spring, H′, fixed to the pivot of the arm F on shaft D′ and projecting each way from the shaft a little farther than the arm F. Each end is bent into the V form (shown at $H^2$) and presses upon the front projection of one of the stud-pins H.

The inverted-V-shaped frame $F^2$ may be moved on its axis $F^3$ so as to bring either of the pins H into its respective notch on the end of the arm F, where it is held by the bent V-shaped end of the spring H, which springs over the pin, the other spring at the same time escaping from its notch and from its spring when that side is so engaged with the arm F, which, as shown in the drawing Fig. 3, in the right side, will, on being raised by the cam $F^7$ and slide $F^4$, raise that end of the curved arm F, oscillating it on the axis D′, throwing the feed-shoe to the left. The said shoe is also raised immediately before to bring it into contact with the cloth by its cam $E^7$ and slide E′. If it is required to feed in the opposite direction, the inverted-V-shaped frame $F^2$ is moved to the right to disengage the pin at the right with the arms $F^2$ and engage the other pin at the other end. Then when the said frame is raised the shoe will be moved to feed to the right.

The amount of the movement of the feed-shoe is governed by the bent arm $H^3$ $H^4$ and an adjusting-screw, $H^7$, through the table, bearing with the lower end on the end $H^4$ of the arm, and at a distance from the end the arm is pivoted to the under side of the table and curved, so that the part $H^3$ may be brought under the stud-pin $F^6$ of the bar $F^4$ and arrest its downward movement, thereby keeping the shoe on $F^4$ a greater or lesser distance from the cam $F^7$, which correspondingly limits the oscillation of the bar F or its extent of feeding movement. The screw $H^7$, for adjusting the arm, is operated by means of a screw-driver through a hole in the slide $D^{12}$.

The cloth-presser I slides in a vertical slot in the head of the needle-arm support, and is provided with a rod, I′, which passes through a hole above the same to the top, where a square socket, $I^2$, is formed.

$I^3$ is a finger-piece, square at the bottom, attached to said rod, and which fits with its square in said socket, and is capable of turning when raised out of the socket. When so turned one-eighth of a revolution it will rest with its corners on the wall tops, and in this way the presser is out of action against the action of the spiral spring $I^4$, and by one-eighth of a revolution one way again the presser will come down again into contact with the table.

K is a tension-spring provided with the vertically-projecting ends, having points K′, for taking into the hole in the bobbin at each end, and having a right-and-left threaded screw, $K^2$, for moving said points to or from each other. The lower part of the spring is connected to a support, $K^3$, screwed to the needle-arm support, and the screw $K^2$ is provided with a disk, $K^4$, working in a grooved friction-block, $K^5$, which is the upper end of said spring-support, to prevent it from being turned by working the machine, and the nuts of said screw are movable.

L represents a spooling device, consisting of a stock projecting through the table, supported by a cylindrical spring, and supporting a grooved pulley, L′, at the bottom and another, $L^2$, at the top. The upper pulley has a spindle, to which the spool $L^3$ may be connected by one end, so as to be turned by it, the other end being supported in an arm, $L^4$, of the stock. A cord is fixed on the grooved pulleys, and the lower one is allowed to rest on the friction-wheel $B^7$, which may be worked in the direction to slip the clutch $B^{11}$ for spooling.

When the spooling device is not required for use it may be raised a little and removed from contact with the wheel $B^7$, or it may be removed from the table.

Having thus described my invention, what I claim as new, and desire to secure by Letters Patent, is—

1. The combination of the treadle A and clamp $A^2$ with the machine-frame, whereby the treadle may be adjusted to either side or end of the frame, according to the direction of the feeding movement, all substantially as specified.

2. The arrangement of the driving-wheel $A^{11}$, hinged supporting-frame B, eccentric plate $B^3$, adjustable hanger $B^5$, and spring $B^4$, substantially as specified.

3. The combination and arrangement of the vertically-adjustable driving friction-wheel $A^{11}$, loose friction-wheel $B^7$, ratchet-clutch $B^{11}$, spring $B^{12}$, fly-wheel $B^{13}$, and friction-lever $B^{14}$, all substantially as specified.

4. The combination, with the stand and table-plate, of the jointed brace $B^{18}$ and sleeve $B^{19}$, when constructed and arranged as specified.

5. The crank-shaft $B^8$, adjustable connecting-rod C′, oscillating plate $C^3$, rod $C^4$, connected by ball-joints with oscillating plate, and needle-arm $C^5$, all constructed as described, and arranged as specified.

6. The combination, with the curved pivoted shuttle-carrying arm, having spring-forks to retain the shuttle, of the crank-shaft $B^8$, when the shaft and shuttle-carrier are connected by the adjustable connecting-rod $D^3$, constructed, as described, to compensate for the wear of parts, substantially as specified.

7. The combination, with the shuttle, of the tension-spring $D^8$, set-screw $D^{10}$, and guards $D^{11}$, when arranged, substantially as specified, to prevent the thread from catching on the adjusting-screw.

8. The combination of the feed-shoe E, vertically-sliding plate $E'$, adjusting-spring $E^5$, set-screw $E^8$, carrier $E^2$, and cam $E^7$, all substantially as specified.

9. The combination, with the feed-carrier $E^2$ and notched bar F, of the inverted-V-shaped frame $F^2$, stud-pins H, spring $H'$, bar $F^8$, with stud $F^9$, vertical slide $F^4$, and cam $F^7$, all substantially as specified.

10. The combination, with the vertical slide $F^4$ and stud-pin $F^6$, of the bent arm $H^3$ $H^4$ and adjusting-screw $H^7$, substantially as specified.

11. The combination, with tension-spring K, connected to the needle-arm support, as described, of the right-and-left threaded screw $K^2$, with movable nuts, and the disk $K^4$ and friction-block $K^5$, all substantially as specified.

12. The spooling device L, consisting of the vertical stock-arm $L^4$, grooved pulleys $L'$ and $L^2$, and arranged relatively to the table, and friction-wheel $B^7$, all substantially as specified.

The above specification of my invention signed by me this 4th day of December, 1869.

P. J. CLEVER.

Witnesses:

E. J. KEPERSTEIN,

RICHARD BOSSE.